Oct. 31, 1961  F. HAAR  3,006,283
HYDRAULIC TRANSDUCER
Filed Feb. 21, 1957  3 Sheets-Sheet 1
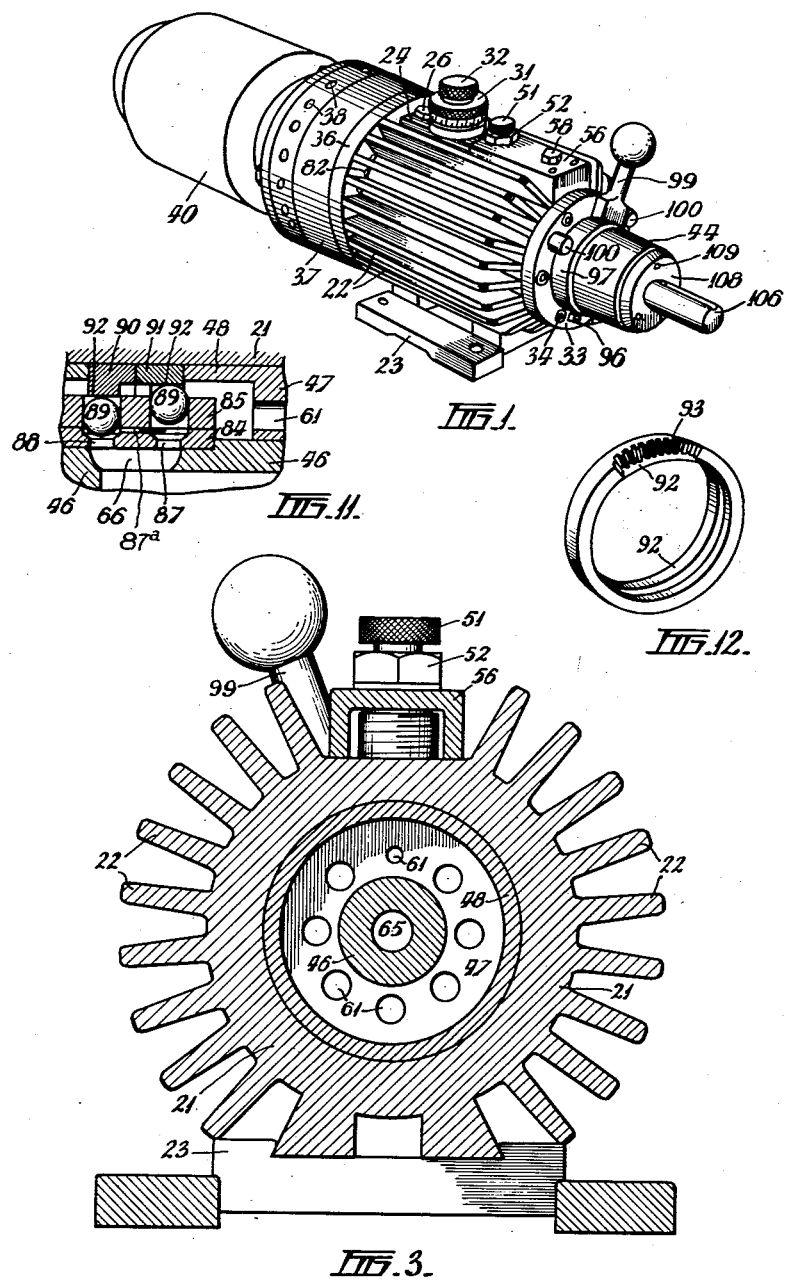

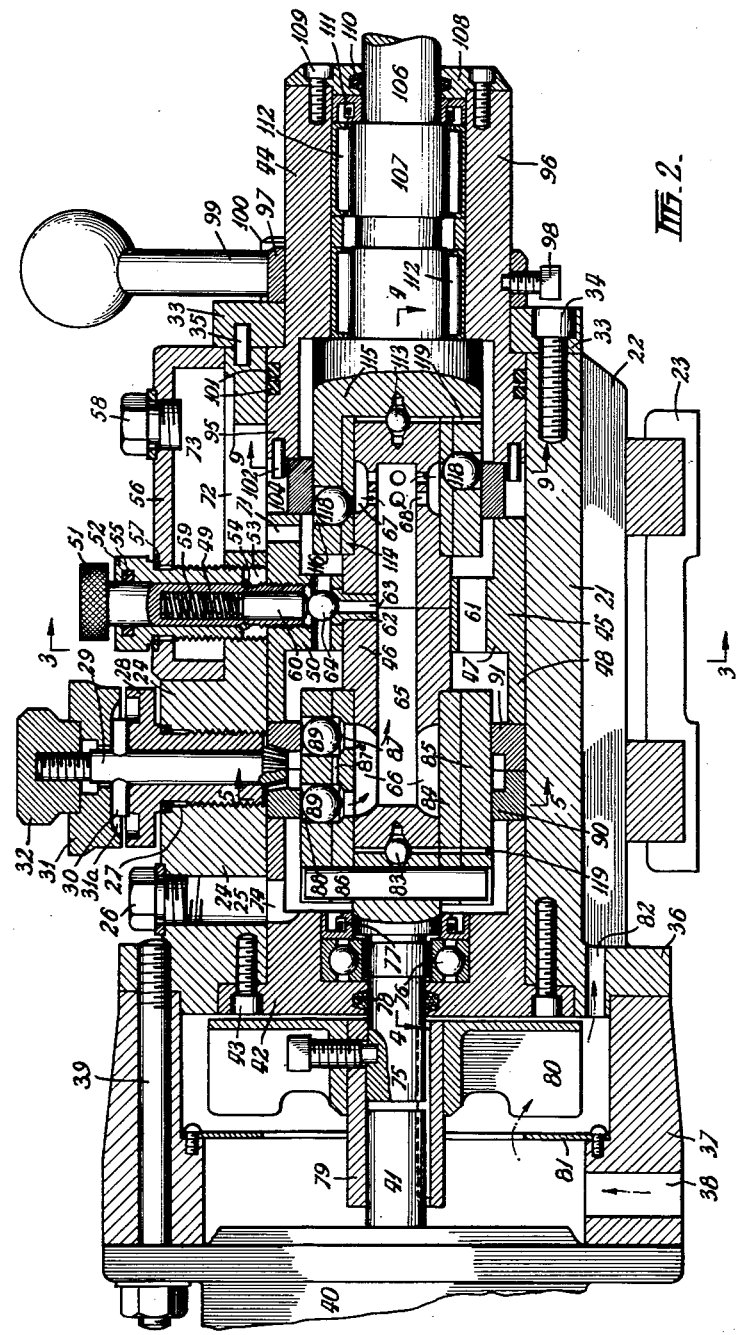

Oct. 31, 1961 — F. HAAR — 3,006,283
HYDRAULIC TRANSDUCER
Filed Feb. 21, 1957 — 3 Sheets-Sheet 3

United States Patent Office 3,006,283
Patented Oct. 31, 1961

3,006,283
HYDRAULIC TRANSDUCER
Felix Haar, East Bentleigh, near Melbourne, Victoria, Australia, assignor to Felix Haar, East Bentleigh, Albert Leslie Cohen, Sandringham, and Leslie Herbert Stanley Cohen, Moorabbin, all near Melbourne, Victoria, Australia
Filed Feb. 21, 1957, Ser. No. 641,667
5 Claims. (Cl. 103—161)

This invention relates to improvements in hydraulic couplings and it refers particularly to apparatus adapted to be operated by hydraulic means and to be used for the transmission of power or for the conversion of torque over a wide range of shaft speeds. Such apparatus, when used to transmit power from a driving shaft to a driven shaft and to control or vary the speed of the driven shaft is sometimes referred to as a hydraulic coupling or fluid transmission. In the following description and claims the terms "hydraulic coupling or fluid transmission" will be used to refer to such apparatus.

The invention has been devised particularly with the object of providing a new and improved hydraulic coupling which will provide for a great flexibility in operation, be variable in speed and capacity, be relatively efficient in use, and easy to control. A further object of the invention is to provide a hydraulic coupling for transmitting power from, for example, an electric motor so as to provide means for varying the effective speed of the output shaft.

According to the invention there is provided a housing, a driving shaft and a driven shaft mounted rotatably relative to the housing, a driving member on the driving shaft and a driven member on the driven shaft, a series of radial or substantially radial openings or cylinders in the driving member and a series of radial or substantially radial openings or cylinders in the driven member, piston members movable in the openings or cylinders of each of the driving member and the driven member, cam means engaged by the piston members of the driven member, means for moving the piston members of the driving member linearly in the openings or cylinders of said driving member, means for conducting fluid moved by the piston members of the driving member to the openings or cylinders of the driven member so as to cause the piston members in said cylinders of the driven member to press upon the cam means and thereby effect rotation of the driven member.

There are preferably provided means for varying the rate of effective fluid movement from the driving member to the driven member, and cam means are employed for effecting the movements of the piston members of the driving member. Said cam means for engagement by the piston members of the driven member may be so arranged that by movement of the cam means the direction of rotation of the driven member may be varied. It is also preferred that the means for varying the rate of effective fluid movement from the driving member to the driven member may consist of cam means adapted to be moved in position so as to vary the effective movement of the piston members of the driving member so that the output of the driving member may be varied as desired.

According to another aspect of the invention there is provided, in a hydraulic coupling, a central core member having a passageway through it and radial openings in communication with said passageway, a driving member rotatable relative to the central core member, a driving shaft connected to the driving member, a number of substantially radial openings in the driving member, piston members movable in said openings, means for causing said piston members to travel inwardly so as to force hydraulic fluid to travel through the radial openings in said central core member and thence through the passageway in said central core member, a driven or output member rotatable relative to the central core member, a driven shaft connected to the driven member, a number of openings in the driven or output member, piston members movable in said openings, the piston members being adapted to be forced outwardly by the pressure of hydraulic fluid forced through the central core member by the driving member, and cam means engaged by the piston members of the driven member for converting the outward movement of the latter piston members into rotary movement of the driven or output member.

In order that the invention may be clearly understood and readily put into practical form we shall now describe, with reference to the accompanying illustrative drawings, a preferred construction of variable speed fluid transmission made according to this invention. In these drawings:

FIG. 1 is a perspective view of the fluid transmission directly coupled to an electric motor;

FIG. 2 is a vertical, longitudinal cross-section through the fluid transmission, illustrating the arrangement of the ports, passageways and control devices;

FIG. 3 shows a transverse cross-section through the apparatus, the section being taken in the direction of the arrows and on the plane indicated by the line 3—3 in FIG. 2;

FIG. 11 is a cross-sectional view, taken on the plane indicated by the line 11—11 in FIG. 7, and in the direction of the arrows, depicting the manner in which hydraulic fluid flows from one set of ports to the other when the speed control device is set at zero output and FIG. 12 illustrates the construction of a cam-ring.

Figure 4:
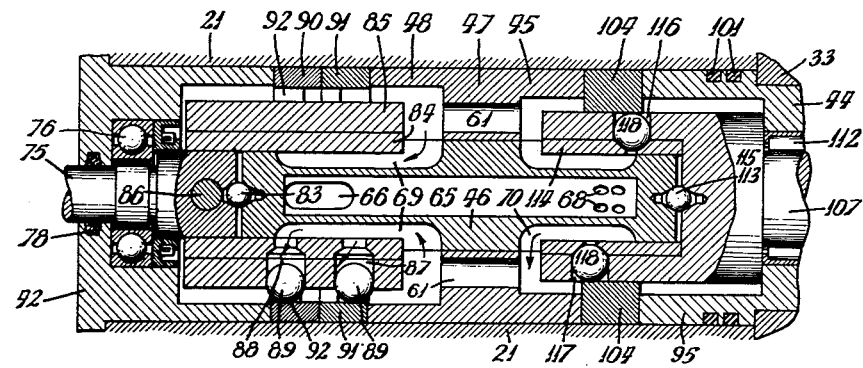
FIG. 4 is a horizontal, longitudinal cross-section through a portion of the apparatus, the section being taken in the direction of the arrows and on the plane indicated by the line 4—4 in FIG. 2.

The hydraulic coupling or fluid transmission illustrated in these drawings has a housing indicated generally by the reference numeral 21. This housing is formed with a number of fins 22 which extend substantially radially from the housing—see particularly FIGS 1 and 3—and it is provided with a mounting 23 by means of which the mechanism may be fastened in position on a bench or machine bed. At the top of the housing 21 is an embossment 24 having in it a filler opening 25, into which is screwed a closure plug 26, and an internally screw-threaded opening 27 accommodating a plug member 28. Gaskets are provided so as to ensure that there is no leakage of hydraulic fluid past the closure plug 26 and the plug member 28. Rotatably fitted in the plug member 28 is a shaft 29 having near its upper end a transverse in 30 supporting a graduated dial head 31 fitted to the upper end of the shaft 29. This graduated dial head 31 has a transverse groove 31a in which fits the pin 30 and it is fastened in position on the shaft 29 by the knurled finger piece 32.

A plate 33 is fastened at the front of the housing by screws 34 and dowels 35, and at the rear of the housing 21 is a circumferential flange 36.

A substantially cylindrical cover 37 having in it air inlet openings 38 is fastened to the rear of the housing 21 by bolts 39. These bolts are also employed to hold in position an electric motor 40, the motor 40 being thus fastened to the cover 37, and therefore to the housing 21, with the axis of rotation of its armature shaft 41 co-axial with that of the input shaft of the hydraulic mechanism.

A fixed sleeve member 42 is fastened within the rear end portion of the housing 21 by bolts 43, a rotatable sleeve member 44 is rotatably mounted at the front of the housing 21—being held in position by the front plate 33—and between these parts 42 and 44 is a core member 45. This latter member 45 has a central core 46, which is fitted tightly within a web 47, and a rim 48 and it is fastened securely in position within the housing 21 by means of a screw-threaded hollow stem 49 which is screwed into an opening 50 formed in the rim 48 and web 47 of the core member 45. Said stem 49 has a knurled finger piece 51 at its outer end, and it is fitted rotatably in a screw-threaded ferrule 52 which is screwed into a tapped hole 53 in the housing. The stem 49 is held within the ferrule 52 by means of a circlip 54 and a gland 55 is provided in the ferrule 52 for the purpose of preventing leakages of hydraulic fluid past the stem 49.

The ferrule 52 also fits through a box-like cover 56 which is fastened to the housing 21 forwardly of the embossment 24—see FIGS. 1 and 2—and a gasket 57 is provided to prevent leakages of hydraulic fluid. A closure plug 58 is also fitted into an opening in that box-like cover.

Mounted within the hollow stem 49 are a compression spring 59 and a plunger 60. A number of holes 61 are formed longitudinally through the web 47, and there is a radial hole in which is fitted a tubular insert 62, this insert also fitting in a radial hole in the central core 46 and having a passageway 63 communicating with one of the longitudinal holes 61. The outer end portion of the tubular insert is formed as a seating for a ball 64 on which rests the inner end of the plunger 60. The ball 64 is normally held on its seating by the pressure of the spring 59. This ball constitutes a relief valve to permit escape of hydraulic fluid from the interior of the core 46 in the event of the pressure reaching too high a level.

Through the central core 46 is a passageway 65 and there are two slots 66 in the rear end portion of the core communicating with that passageway, and in the front end portion there are four grooves or recesses 67 each having two holes 68 leading from the grooves to the passageway 65. In the rear end portion of the central core 46 there are also two transfer grooves 69—see FIG. 4—and in the front end portion of the core 46 there are four transfer or exhaust grooves 70. The transfer grooves 69 and slots 66 are equally spaced about the core 46—that is, their arcuate spacing is 90°—and the groove 67 and transfer grooves 70 are also equally spaced with an angular spacing of 45°, in alternating arrangement. It is apparent that fluid can flow through the slots 66 into the passageway 65 and out through the holes 68 in the grooves 67.

In the rim of the core member 45 are two holes 71 which communicate, through an opening 72 in the wall of the housing, with the interior 73 of the box-like cover 56.

The fixed sleeve member 42 has a radial opening 74 which is in communication with the filler opening 25, and an axial opening in which is fitted a driving shaft 75. This shaft is journaled in a bearing 76 mounted in the fixed sleeve member, and there is provided an oil seal 77 and a gland 78 for the purpose of preventing escape of hydraulic fluid past the shaft. The driving shaft 75 is co-axial with the armature shaft 41 to which it is connected by a sleeve 79, both shafts being keyed to that sleeve. On the sleeve is fitted a cooling fan 80 adapted to draw cooling air through the openings 38, through a central opening in a web 81 fitted within the cylindrical cover 37 and out through openings 82 in the circumferential flange 36 so as to provide for a flow of cooling air past the fins 22.

Between the front end of the driving shaft 75 and the rear end of the central core 46 there is fitted a ball bearing 83 which is seated in openings provided in the adjacent ends of said two members. This ball 83 centres the shaft 75 relative to the central core 46 and takes any end thrust loading.

Mounted on the front end portion of the driving shaft 75 are an inner sleeve 84 and an outer sleeve 85. Each of these sleeves is slotted at its rear end to accommodate a pin 86 fastened diametrally through the driving shaft 75. Through that pin 86 a drive is transmitted from the shaft 75 to the two sleeves 84 and 85. The inner sleeve is a neat fit on the rear end portion of the central core 46, and is rotatable relative thereto.

Through the inner and outer sleeves are formed a number of radial openings 87 and 88—as two rows of seven openings each. These openings are tapered near their inner ends to provide for a smooth flow of hydraulic fluid and in the openings 87, 88 are fitted balls 89 which act as piston members. These balls fit neatly in the openings and they can move radially for a short distance—the effective distance between the outer surface of the outer sleeve 85 and the tapered portions in the inner sleeve 84 being greater than the diameter of the balls 89. The openings 87, 88 are so located that they can register with the slots 66 in the central core 65—see FIG. 2. As there are two opposed slots 66 and as there are an uneven number of openings 87, 88 in each row—as seven—it is apparent that each pair of openings 87, 88 will register with a slot 66 when a nearly-opposite pair of openings 87, 88 is moving out of registration with the other slot 66—see FIG. 5. In fact, the openings 87, 88 are so spaced that there will always be two pairs of nearly-opposite openings 87, 88 in register with the opposed slots 66.

Figure 5:
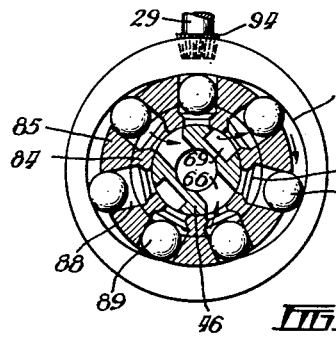
FIG. 5 illustrates the arrangement of the speed-control devices when set for maximum speed of the output shaft, the view being a transverse cross-section in the direction of the arrows and on the plane indicated by the line 5—5 of FIG. 2.
Figure 7:
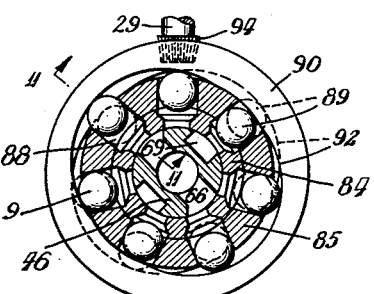
FIGS. 7 and 8 are views similar to FIGS. 5 and 6, respectively, but illustrating the arrangement of the parts from zero output.
Figure 6:
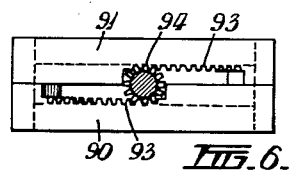
FIG. 6 shows the relative arrangements of the pinion and two cam rings for controlling the speed of the output shaft of the motor, the figure being a plan view of the apparatus depicted in FIG. 5.
Figure 8:
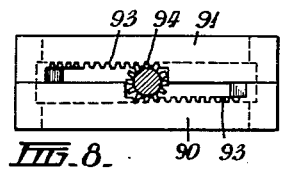

Mounted between the front end of the fixed sleeve 42 and the rear end of the core member 45 are two cam rings 90 and 91. These cam rings are of the design illustrated in FIG. 12, in particular, and as also illustrated in FIGS. 5-8. Each cam ring has a substantially circular outer surface adapted to fit neatly, but turnably, in the bore of the housing 21, an inner cam surface 92 and a rack portion 93. These two cam rings 90, 91 are mounted with their rack portions 93 in opposition—see FIGS. 6 and 8—and these rack portions are engaged by a pinion 94 fastened on the inner end of the shaft 29. By turning the dial head 31 the shaft 29 may be caused to rotate, and the rotation of the pinion 94 will effect a partial rotation of the two cam rings 90, 91 in opposite directions. When the cam rings are in the relative positions as illustrated in FIG. 6 the cam surfaces 92 of the two cam rings will be in corresponding or registering positions, but when the pinion 94 is turned the cam rings will be moved out of registration. At the extreme limit of the movement of the cam rings they will be in direct opposition. The balls 89 are adapted to engage with the cam rings and to be moved inwardly of the outer sleeve 85 thereby. When the cam rings are in registration as illustrated in FIGS. 5 and 6 the two balls 89 of a pair—as depicted in FIGS. 2 and 4—will be moved in synchronism but when the cam rings are in direct opposition—as illustrated in FIGS. 7 and 8—the ball 89 of one row will be moved oppositely to the adjacent ball of the other row. That is to say, when one ball is moved inwardly by its cam ring the other ball will be moved outwardly.

The rotatable sleeve member 44 has a cylindrical portion 95 which is located within the housing 21 and a neck portion 96 which extends forwardly of the housing, the front plate 33 operating to hold the member 44 in position. A ring member 97 is mounted on the neck portion 96 and is fastened thereto by a set screw 98. On the ring member is a handle 99 which can be moved angularly between two pins 100 fastened to and extending forwardly of the front plate 33.

Figure 9:
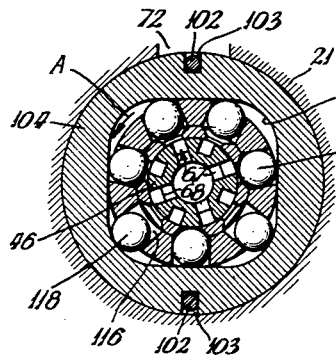
FIGS. 9 and 10 are transverse cross-sectional views taken in the direction of the arrows and on the plane indicated by the line 9—9 in FIG. 2, FIG. 9 illustrating the arrangement of the parts for forward drive and FIG. 10 illustrating the arrangement when the direction of rotation is reversed.
Figure 10:
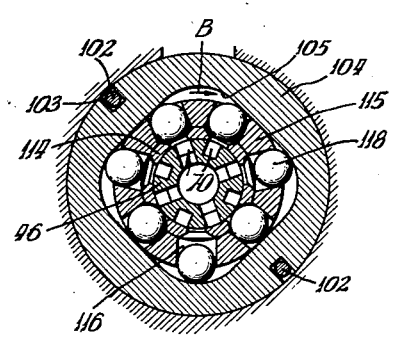

There are two glands 101 in the cylindrical portion 95 and, at the rear end of that part 95 there are two pins 102 which engage in opposed slots 103 in an internal cam member 104. This cam member is located between the rear end of the rotatable sleeve member 44 and the front end of the rim 48 of the core member 45 so as to be rotatable within the housing 21. The inner surface 105 of the cam member 104 is somewhat square in shape, with rounded corners—see FIGS. 9 and 10. It is apparent that when the handle 99 is moved angularly it will turn the rotatable sleeve member 44 and the internal cam member 104. FIGS. 9 and 10 illustrate different positions of the internal cam member 104.

Rotatably mounted in the rotatable sleeve 44 is the driven or output shaft 106 of the mechanism. This shaft has an intermediate portion 107 located within the neck portion 96 of the member 44 and an end plate 108 is fastened to the front end of the member 44, by screws 109, so as to hold the shaft rotatably in position. A gland 110 is fitted within the end plate 108 and an oil seal 111 is mounted between the end plate 108 and the intermediate portion 107 of the shaft. The output shaft 106 is journaled in roller bearings 112 housed within the member 44 and a bearing ball 113 is fitted between the front end of the central core 46 and the inner end of the shaft 106 so as to take any end thrust between the two parts.

At the inner or near end of the output shaft 106 is an inner sleeve 114 and an outer sleeve 115, the inner sleeve being a neat rotary fit on the front end portion of the central core 46. In these sleeves are two rows of holes 116 and 117—the holes 117 being in staggered relationship with the holes 116 and there are seven of each.

As there are four slots 67 equally spaced about the central core 46 and as there are seven holes in each row 116 and 117, and as they are in staggered relationship, it is apparent that when one hole 116 is in register with a slot 67 then a hole 117 will be in register with the opposite slot 67 and no holes 116, 117 will be directly in register with the intermediate slots 67. Each of the holes 116, 117 is tapered near its inner end to constitute a seating for a ball 118. These balls fit neatly in the holes 116, 117 and the holes are of such depth that they can accommodate the balls without said balls projecting beyond the cylindrical surface of the outer sleeve 115.

The holes 116, 117 are so arranged and the internal cam member 104 is so located that the balls 118 can travel within said member in contact with the inner surface 105 thereof—see FIGS. 9 and 10.

At the front end of the sleeve 114, 115 there is a small pressure relief opening 119. This ensures that there cannot be any accumulation of hydraulic pressure between the adjacent ends of the central core 46 and output shaft 106. A similar opening 119 is provided in the inner and outer sleeves 84, 85 of the driving shaft.

In the operation of the apparatus the electric motor 40 is switched on so that there is transmitted a drive through the armature shaft 41 to the driving shaft 75. The rotation of the driving shaft 75 causes the inner and outer sleeves 84, 85 to be turned about the central core 46. If the two cam rings 90, 91 be set in registration as indicated in FIGS. 2, 5 and 6 then the pairs of balls 89 in the openings 87, 88 will be moved in synchronism. That is to say, the two balls 89 of a pair will be forced inwardly by the cam rings 90, 91 at the same time. In their inward movement the balls 89 will act as pistons and will force hydraulic fluid from the openings 87, 88 through the slots 66 and into the passageway 65 through the central core 46. The hydraulic fluid will flow from the passageway 65 through the openings 68 and slots 67 into the substantially radial openings 116, 117, thereby forcing the balls 118 outwardly. This outward pressure upon the balls 118 will cause the balls to press upon the inner surface 105 of the internal cam member 104 and as a result of this pressure upon the cam surface 105 the output shaft 106 will be caused to rotate.

The speed of rotation of the output shaft 106 will be due to the volume of hydraulic fluid forced into the passageway 65 by the balls 89. If, then, the cam rings 90, 91 be turned relative to each other so that the operation of the balls 89 is not in synchronism there will be delivered into the passageway 65 a lesser volume of hydraulic fluid. The two cam rings 90, 91 may be turned so that they are completely out of phase, as indicated in FIGS. 7, 8 and 11. When in this position the ball 89 in an opening 88 will cause a quantity of hydraulic fluid to be moved inwardly when the ball in that opening 88 is forced inwardly by the cam ring 90, but as the ball in the adjacent opening 87 is at that time permitted to move outwardly the hydraulic fluid forced from the opening 88 will merely flow through the slot 87a into the opening 87 as is clearly illustrated by the arrow in FIG. 11. Thus, there will be no hydraulic fluid forced through the passageway 65 of the central core 46 and, thus, there will be no power transmitted by the mechanism. By setting the cam rings 90, 91 at intermediate positions there may be obtained any desired rate of output between the maximum—when said cam rings are in registration and the balls 89 are moved in synchronism—and between the minimum of no output.

As the inner and outer sleeves 84, 85 travel around the central core 46 hydraulic fluid is forced from the openings 87, 88 as those openings pass the slots 66. As the openings 87, 88 travel further about the central core 46 they pass the transfer grooves 69—when the balls 89 are moved outwardly as is shown in FIG. 5—and thus said openings 87, 88 are again charged with hydraulic fluid—see FIG. 4. The slots 66 and the transfer grooves 69 are so spaced that a pair of openings 87, 88 cannot be in registration with a transfer groove 69 and a slot 66 at the one time.

As the shaft 106 is caused to rotate by the pressure of hydraulic fluid that hydraulic fluid is forced into the openings 116, 117 through the slots 67. Then as the shaft 106 turns further and the balls 118 are forced inwardly by the internal cam member 104 the hydraulic fluid in the openings 116, 117 will be ejected through the transfer grooves 70. The hydraulic fluid thus ejected can flow through the openings 61 in the web 47 of the core member 45. That is to say, hydraulic fluid forced from the rear portion of the apparatus by the balls 89 flows forwardly through the passageway 65 to the front portion of the apparatus and it then moves rearwardly through the openings 61 so that there is a continuous circulation or flow of hydraulic fluid when the apparatus is in motion and power is being transmitted from the driving shaft 75 to the output shaft 106.

If it be desired to reverse the direction of rotation of the output shaft 106 the handle 99 may be moved angularly so as to turn the internal cam member 104 relative to the housing 21. When this cam member 104 is turned the outward pressure exerted upon the balls 118 by the hydraulic fluid will cause the output shaft 106 to be turned in the opposite direction. When the handle 99 is in one position—as determined by the location of one of the pins 100—then the internal cam member 104 will be in the position as indicated in FIG. 9 and the output shaft 106 will turn in the direction of the arrow A in that figure. When the handle 99 is moved to the other position as determined by the other pin 100 then the internal cam member 104 will be turned to the position as indicated in FIG. 10 and the output shaft 106 will be caused to rotate in the direction of the arrow B in that figure.

The setting of the cam rings 90, 91 to regulate the speed of rotation of the output shaft 106 is conveniently effected by turning the dial head 31, when the pinion 94 is caused to rotate and the cam rings 90, 91 are turned relative to that pinion. The dial head 31 may be graduated to indicate the speeds of rotation of the output shaft 106 for different settings of the dial head 31.

It will be found that the apparatus made according to this invention, and as illustrated in the drawings and described above, will be very convenient to operate. The apparatus will provide for a change of speed of the output shaft 106 in an infinitely variable ratio. For example, if the cam rings 90, 91 be so constructed that there may be transmitted power from the driving shaft 75 to the output shaft 106 at a speed ratio of 2:1—the output shaft travelling at one-half the speed of the driving shaft—then there may be obtained a speed of rotation of the output shaft at any intermediate ratio down to zero. Furthermore, the reversal of the direction of rotation of the output shaft may be conveniently effected.

The apparatus will be found to be very efficient in use. If there be an overloading of the output shaft 106 beyond the capacity of the motor 40 so that said output shaft will be slowed in its rotation then there will be built up within the passageway 65 an excess of hydraulic pressure. When this excess of pressure develops hydraulic fluid will be allowed to flow through the passageway 63 in the tubular insert 62 and the ball 64 will be lifted from its seating against the pressure of the spring 59 exerted through the plunger 60. Thus, even if the output shaft 106 be stopped in its rotation the electric motor 40 can continue to operate under a slightly higher load than normal. But the overloading of the motor will not be such as to cause any damage to the motor.

It will be appreciated that the housing may be made in two parts, one accommodating the driving shaft and driving member—the pumping mechanism—and the other accommodating the driven shaft and driven member—constituting the motor—with means for conducting hydraulic fluid from one to the other. The two housing parts, in such an arrangement, are deemed to constitute a single composite "housing."

I claim:

1. In a fluid transmission, a housing defining a reservoir chamber therein adapted to be filled with a hydraulic fluid, a shaft journalled for rotation in said housing, a longitudinally extending core element supported within said chamber and being provided with both a longitudinally extending high pressure passageway therein and with a plurality of radially oriented and angularly spaced flow ports therethrough communicating with said passageway, a rotatably mounted member coaxially circumjacent said core element and being connected with said shaft so as to be rotated in enforced synchronism therewith relative to said core element and being provided with two axially spaced rows each comprising a plurality of radially oriented and angularly spaced cylinders disposed in pairs so that each pair at one end thereof is successively aligned with the respective flow ports for communication therewith upon relative rotation between said rotatable member and core element, each of said cylinders communicating at the other end thereof with said reservoir, a plurality of pistons respectively reciprocable within said cylinders for displacing fluid therefrom through certain of said flow ports and into said passageway upon relative rotation between said rotatable member and core element, a pair of cams respectively circumjacent said rows of cylinders for engagement with the pistons therein to effect reciprocation thereof upon relative rotation between said rotatable member and core element and being supported by said housing for selective angular adjustments with respect thereto and with respect to each other, an adjusting element connected with said cams for selectively changing the relative angular positions thereof between a first position of synchronous displacement of each of said pairs of pistons defining a maximum torque-transmitting position wherein the volume of fluid displaced into said passageway by said pistons is maximized and a second position of synchronous opposition defining a minimum torque-transmitting position wherein the volume of fluid displaced into said passageway by each of said pairs of pistons is minimized, said core element having a plurality of radially oriented and angularly spaced transfer grooves interposed between said flow ports and each being in continuous and open communication with said chamber for receiving hydraulic fluid therefrom, said pairs of cylinders being successively brought into alignment with said transfer grooves for being supplied with hydraulic fluid therefrom upon relative rotation between said rotatable member and core element, and release valve structure in communication with said passageway for permitting the escape of fluid therefrom whenever the fluid pressure therein exceeds a predetermined level.

2. The structure of claim 1 in which there is provided an even number of flow ports and an odd number of cylinders in each of said rows.

3. The structure of claim 1 in which the cylinders comprising each pair thereof are disposed in axial alignment.

4. The structure of claim 1 in which each of said cams is equipped with a gear segment with such segments oriented in facing relation, and in which said adjusting element comprises a drive gear engageable simultaneously with said segments.

5. In a fluid transmission, a housing defining a reservoir chamber therein adapted to be filled with a hydraulic fluid, a shaft journalled for rotation in said housing, a longitudinally extending core element supported within said chamber and being provided with both a longitudinally extending high pressure passageway therein and with a plurality of radially oriented and angularly spaced flow ports therethrough communicating with said passageway, a rotatably mounted member coaxially circumjacent said core element and being connected with said shaft so as to be rotated in enforced synchronism therewith relative to said core element and being provided with two axially spaced rows each comprising a plurality of radially oriented and angularly spaced cylinders disposed in pairs so that each pair at one end thereof is successively aligned with the respective flow ports for communication therewith upon relative rotation between said rotatable member and core element, each of said cylinders communicating at the other end thereof with said reservoir, a plurality of pistons respectively reciprocable within said cylinders for displacing fluid therefrom through certain of said flow ports and into said passageway upon relative rotation between said rotatable member and core element, a pair of cams respectively circumjacent said rows of cylinders for engagement with the pistons therein to effect reciprocation thereof upon relative rotation between said rotatable member and core element and being supported by said housing for selective angular adjustments with respect thereto and with respect to each other, an adjusting element connected with said cams for selectively changing the relative angular positions thereof between a first position of synchronous displacement of each of said pairs of pistons defining a maximum torque-transmitting position wherein the volume of fluid displaced into said passageway by said pistons is maximized and a second position of synchronous opposition defining a minimum torque-transmitting position wherein the volume of fluid displaced into said passageway by each of said pairs of pistons is minimized, said core element having a plurality of radially oriented and angularly spaced transfer grooves interposed between said flow ports and each being in continuous and open communication with said chamber for receiving hydraulic fluid therefrom, said pairs of cylinders being successively brought into alignment with said transfer grooves for being supplied with hydraulic fluid therefrom upon relative rotation between said rotatable member and core element, release valve structure in communication with said passageway for permitting the escape of fluid therefrom whenever the fluid pressure therein exceeds a predetermined level, and thrust-bearing structure interposed between the adjacent ends of said shaft and core element, said shaft and core element at the adjacent ends thereof providing pressure-equalizing passage structure communicating with said chamber for obviating the build-up of a pressure head therebetween.

References Cited in the file of this patent

UNITED STATES PATENTS

| | | |
|---|---|---|
| 1,488,170 | Sandoz | Mar. 25, 1924 |
| 1,904,496 | Maw | Apr. 18, 1933 |
| 2,552,860 | Oliver | May 15, 1951 |
| 2,646,755 | Joy | July 28, 1953 |
| 2,709,422 | Bray | May 31, 1955 |
| 2,872,875 | Mergen et al. | Feb. 10, 1959 |

FOREIGN PATENTS

| | | |
|---|---|---|
| 669,082 | Great Britain | Mar. 26, 1952 |
| 722,004 | Great Britain | Jan. 19, 1955 |